United States Patent [19]
Saucier et al.

[11] Patent Number: 5,944,388
[45] Date of Patent: Aug. 31, 1999

[54] REMOVABLE VEHICLE SEAT

[75] Inventors: Stanton Saucier, Tarzana, Calif.; Marcel Tremblay, Pierrefonds; Charles Danis, Lorraine, both of Canada; Daniel Keating, Canoga Park, Calif.

[73] Assignee: Ricon Corporation, Pacoima, Calif.

[21] Appl. No.: 08/865,459

[22] Filed: May 29, 1997

[51] Int. Cl.$^6$ ............................................. A47C 7/00
[52] U.S. Cl. ............................. 297/440.1; 297/378.13; 297/335; 296/65.1
[58] Field of Search ......................... 296/65.01, 65.03, 296/63; 297/440.1, 335, 336, 331, 378.13; 248/503.1

[56] References Cited

U.S. PATENT DOCUMENTS

| | | |
|---|---|---|
| 3,915,493 | 10/1975 | Brown ........................................ 296/63 |
| 4,220,308 | 9/1980 | Strien et al. . |
| 5,183,314 | 2/1993 | Lorbiecki . |
| 5,224,750 | 7/1993 | Clark et al. ......................... 297/335 X |
| 5,280,987 | 1/1994 | Miller . |
| 5,282,662 | 2/1994 | Bolsworth et al. ................. 297/331 X |
| 5,330,245 | 7/1994 | Boisset . |
| 5,496,088 | 3/1996 | Stewart ................................. 296/65.03 |
| 5,547,242 | 8/1996 | Dukatz et al. ......................... 296/65.1 |
| 5,697,662 | 12/1997 | Leftwich .................................. 296/63 |
| 5,765,894 | 6/1998 | Okazaki et al. ............... 297/378.13 X |

*Primary Examiner*—Peter M. Cuomo
*Assistant Examiner*—Stephen Vu
*Attorney, Agent, or Firm*—Darby & Darby, P.C.

[57] ABSTRACT

A removable vehicle seat is provided that allows for easy removal and reattachment of a vehicle seat to the floor of a vehicle. The design provides a simple structure which permits quick removal and reattachment by a single person but which is stable enough to remain attached to the vehicle floor in the event of an auto accident. The removable vehicle seat is particularly useful for vehicles which are utilized for transporting disabled persons in that removal of the vehicle seats allows for opening up space in a vehicle required for use by persons in wheelchairs.

33 Claims, 13 Drawing Sheets

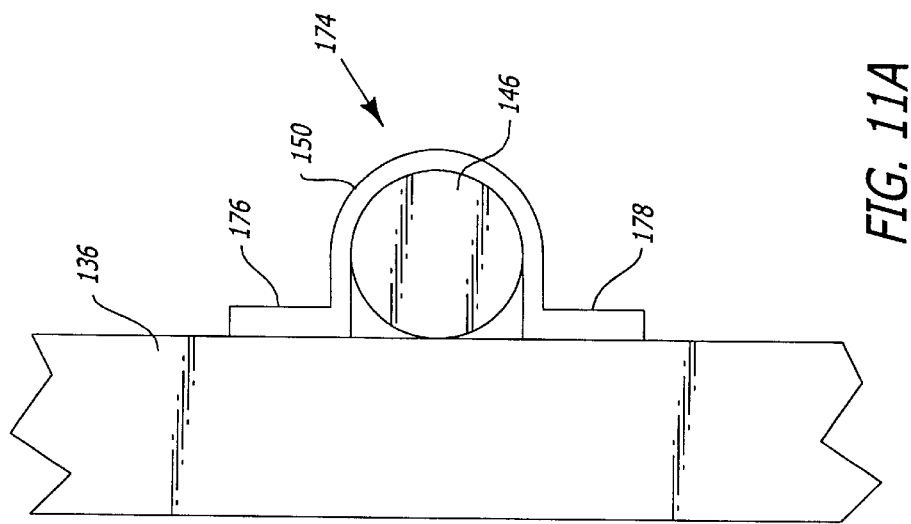
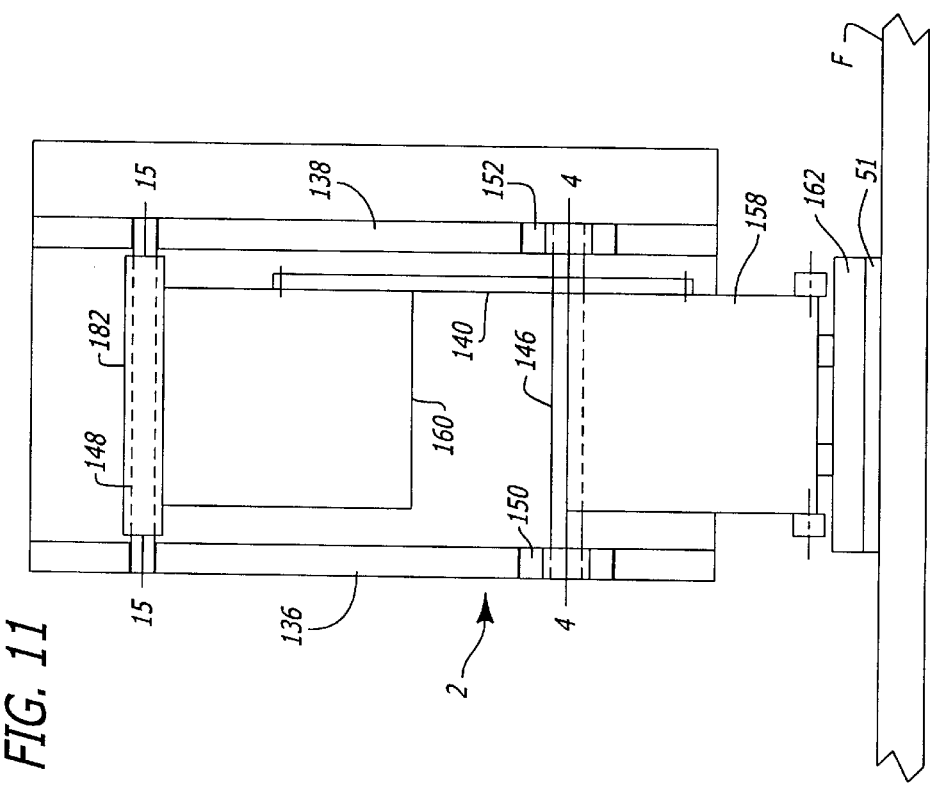

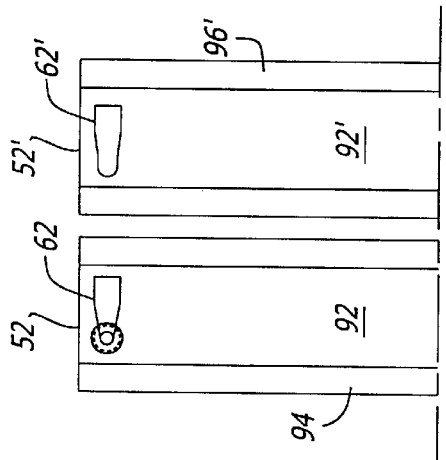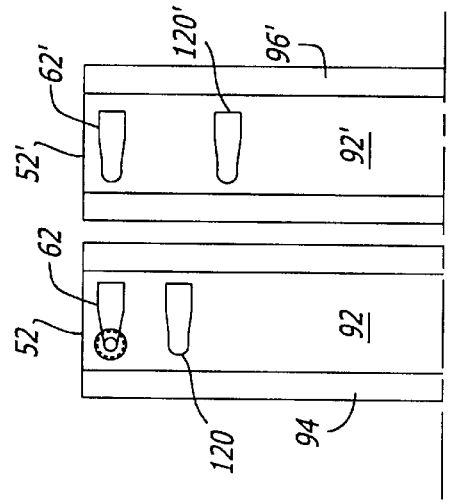
FIG. 14  FIG. 15
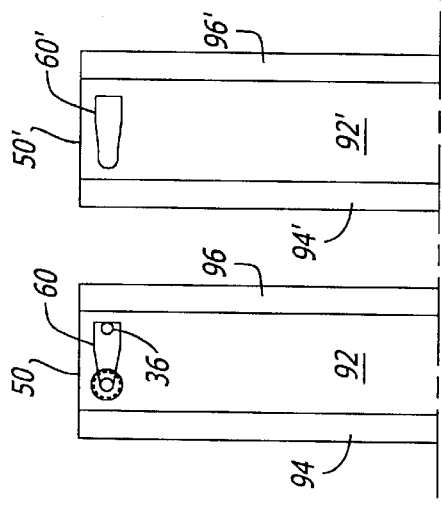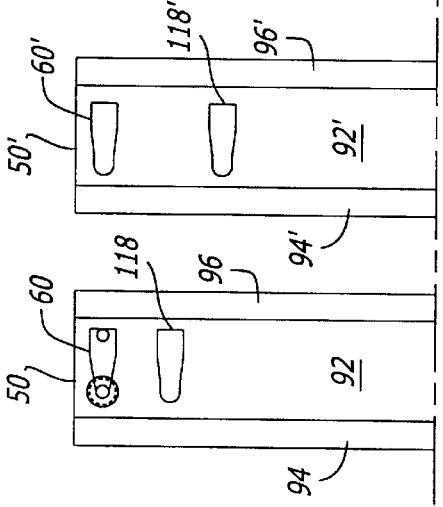

REMOVABLE VEHICLE SEAT

FIELD OF THE INVENTION

This invention relates generally to vehicle seats and specifically to a removable vehicle seat which allows for quick removal and reattachment of the vehicle seat to a vehicle floor. The removable vehicle seat includes a seat base which provides a stable structure and allows for the removal and reattachment of the vehicle seat by a single person.

DESCRIPTION OF THE RELATED ART

Removable seats in vehicles have long been utilized to meet a variety of needs. In particular, removable vehicle seats have been found to be particularly useful for vehicles utilized by disabled persons. The ability to easily remove driver and passenger seats to create additional room for entry and departure in and out of a vehicle is crucial in utilizing a vehicle for physically disabled persons, particularly persons confined to wheelchairs.

Various devices have been created to address this problem which permit the removal and reattachment of vehicles seats. For a removable vehicle seat to be useful, it is necessary that the design allows for quick removal and reattachment of the vehicle seat to the vehicle floor. However, while the vehicle seat must allow for quick removal and reattachment, the vehicle seat design must also be strong and stable enough to securely hold the vehicle seat to the vehicle floor in the event of an auto accident.

Proposed removable vehicle seats have included designs wherein the vehicle seat is fastened to the vehicle floor by utilizing bolts or screws to fasten the seat base to the vehicle floor. While such removable vehicle seat designs securely fasten the vehicle seat to the vehicle floor, they are not practical for use with vehicles for disabled persons in that removal and reattachment of the vehicle seat from the vehicle floor requires bolting and unbolting the seat base to the vehicle floor, a process which is time consuming and difficult.

Other proposed removable seat designs are not actually removable but are simply adjustable in the horizontal direction along the vehicle floor. While these seat mechanisms are useful in clearing space in a particular area, they do not permit the removal of the vehicle seat from the vehicle floor.

Other designs of seat bases are impractical in that they require more than one person for removal and reattachment of the vehicle seat. This is problematic in that quite often the only person available for removal and reattachment of a vehicle seat is the driver of the vehicle which necessitates a removable vehicle seat that can be easily removed and reattached by a single person. Also, these removable vehicle seat designs are flawed in that they require lifting of the vehicle seat to remove the seat from the vehicle. Vehicle seats are often extremely heavy making removal by one person difficult.

Consequently, there exists a need for a removable vehicle seat that is simple in design, yet stable in structure, which allows for easy removal and reattachment by a single person. In addition, the removable vehicle seat must be capable of remaining securely fastened to the vehicle floor in the event of an auto accident.

SUMMARY OF THE INVENTION

In accordance with the present invention, a removable vehicle seat is provided which allows for efficient and easy removal and reinstallation of the vehicle seat to and from a vehicle floor. The removable vehicle seat of the present invention is removed by simple manipulation of a release bar and sliding the seat base outward from locking plates attached to the vehicle floor. In addition, the removable vehicle seat has wheels which facilitates easy removal of the vehicle seat from the vehicle.

The removable vehicle seat of the present invention includes a seat base comprising a housing to which a vehicle seat is permanently attached. Inside the housing is a locking mechanism for attaching the seat base to locking plates affixed to the vehicle floor. The locking plates are affixed to the vehicle floor and serve as a base for receiving the seat base. Inside the seat base is a locking mechanism comprising a lever arm which controls a locking pin for releasably locking the seat base to the locking plates. Extending from the bottom of the seat base are anchor bolts which serve as an additional attachment mechanism to slidably fasten the seat base to the locking plates.

These, as well as other features of the invention, will become apparent from the detailed description which follows, considered together with the appended drawings.

DESCRIPTIONS OF THE DRAWINGS

In the drawings, which constitute part of this specification, exemplary embodiments demonstrating various features of the invention are set forth as follows:

FIG. 4A is a top view of one embodiment of a recess formed within the locking plate;

FIG. 11 is a frontal view of a foldable seat bench in the stowed position;

FIG. 11A is a side view along line 4—4 of the bracket and cross-bar;

FIG. 14 is a top view of multiple locking plates demonstrating alternate arrangements of the locking plates in relation to one another;

FIG. 15 is a top view of the locking plates showing multiple recesses formed in the locking plates to accommodate variously sized seat bases;

DESCRIPTION OF THE ILLUSTRATIVE EMBODIMENTS

As indicated above, detailed illustrative embodiments are disclosed herein. However, structures for accomplishing the objectives of the present invention may be detailed quite differently from the disclosed embodiments. Consequently, specific structural and functional details disclosed herein are merely representative; yet, in that regard, they are deemed to afford a representative embodiment for purposes of disclosure and to provide a basis for the claims herein which define the scope of the present invention.

Figure 1:
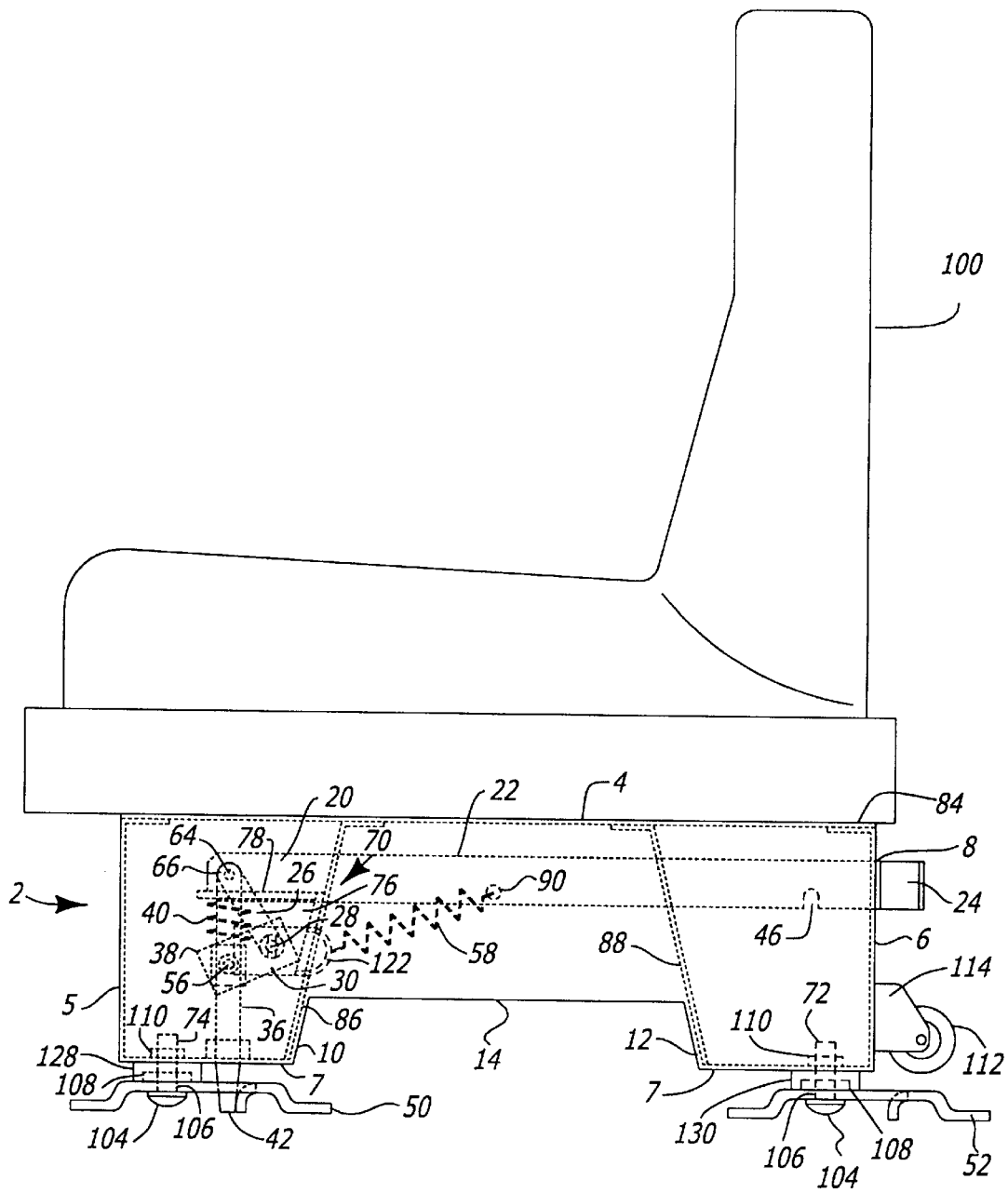
FIG. 1 is a side view of a seat base with a vehicle seat attached with the seat base fastened to locking plates in the locked position.
Figure 7:
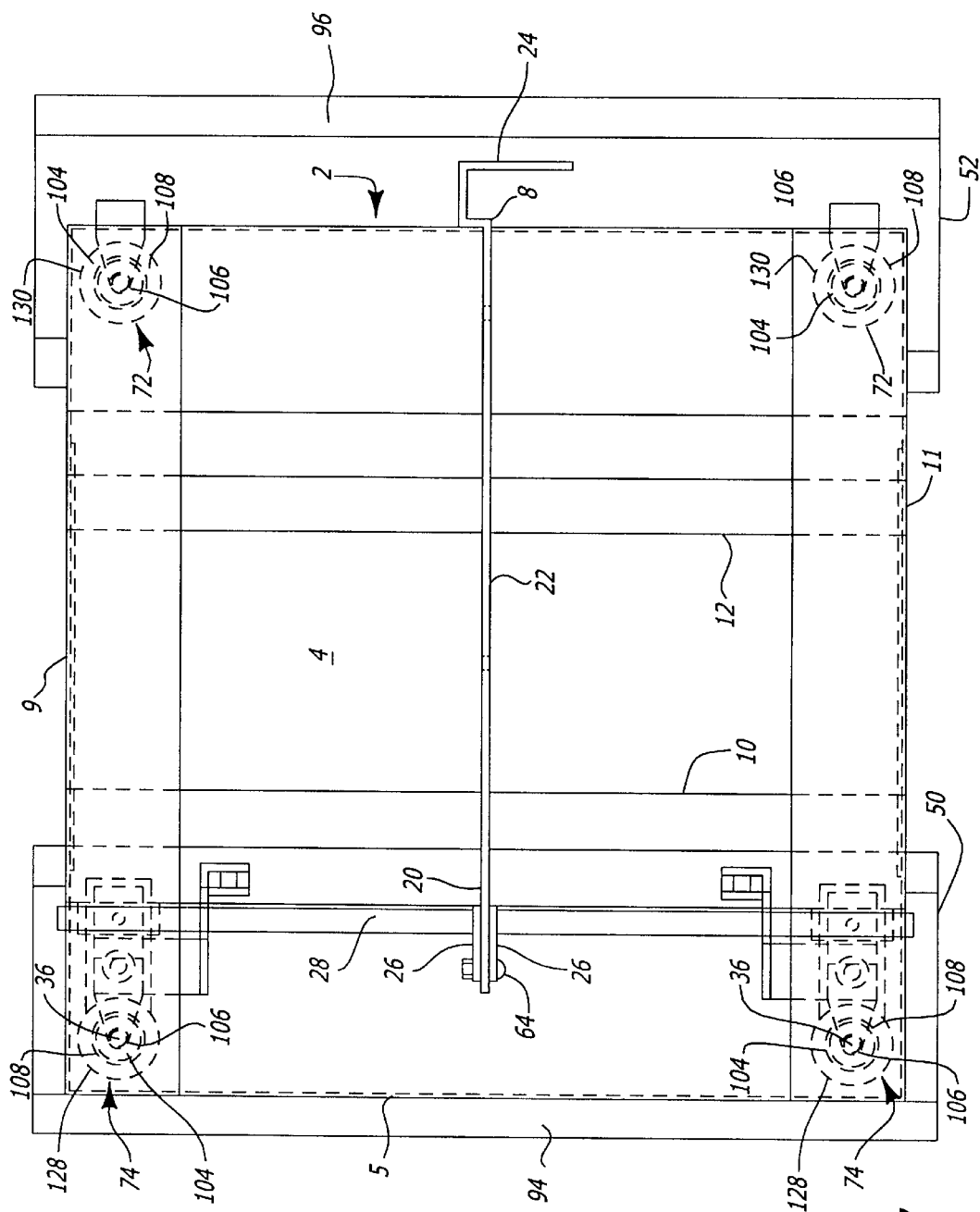
FIG. 7 is a diagrammatic representation of a top view of the vehicle seat base oriented in relation to the locking plates so that the locking plates are in a perpendicular configuration to the lever arm.
Figure 8:
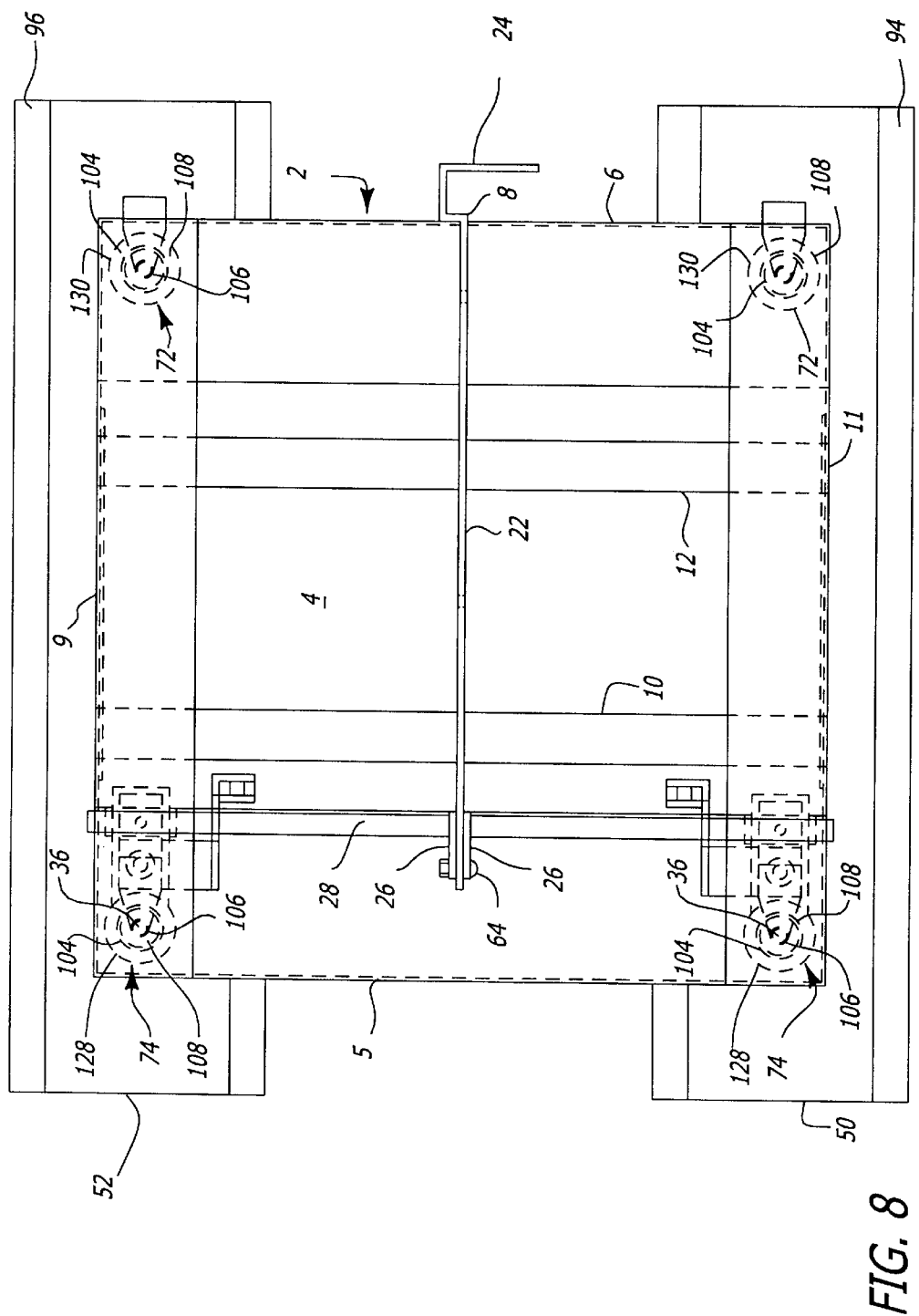
FIG. 8 is a diagrammatic representation of a top view of the vehicle seat base oriented in relation to the locking plates so that the locking plates are parallel to the lever arm.

Referring to FIG. 1, the seat base 2 comprises a housing defining a partial enclosure with a top surface 4 comprised of a top plate 84 to which a vehicle seat 100 may attach. The vehicle seat attaches to the top of the seat base 2 and is generally affixed to the top plate 84 by bolting the vehicle seat to the top surface 4. The seat base 2 has a front surface 5 and a rear surface 6 with an opening 8 (not shown) in the rear surface 6 through which lever arm 22 extends. The seat base 2 has side surfaces 9 and 11 as shown in FIGS. 7–8.

The bottom 7 of seat base 2 has a first and second end 10 and 12 which attach to locking plates 50 and 52 respectively. Located between first and second ends 10 and 12 of seat base 2, is middle portion 14 which is raised above the ground surface between the first and second ends 10 and 12. Extending between the bottom 7 and top 4 of seat base 2 and extending substantially vertically between the first and second ends 10 and 12 to the top surface 4 of the seat base 2, are first and second supporting plates 86 and 88. First and second supporting plates 86 and 88 provide structural support for the seat base 2 and act to divide the interior of seat base 2 into three sections comprising the first end portion 10, the middle section 14 and the second end portion 12. Both supporting plates 86 and 88 have an opening formed within the plates near the top 4 of the seat base 2 to allow lever arm 22 to extend through the interior of the housing.

Figure 2:
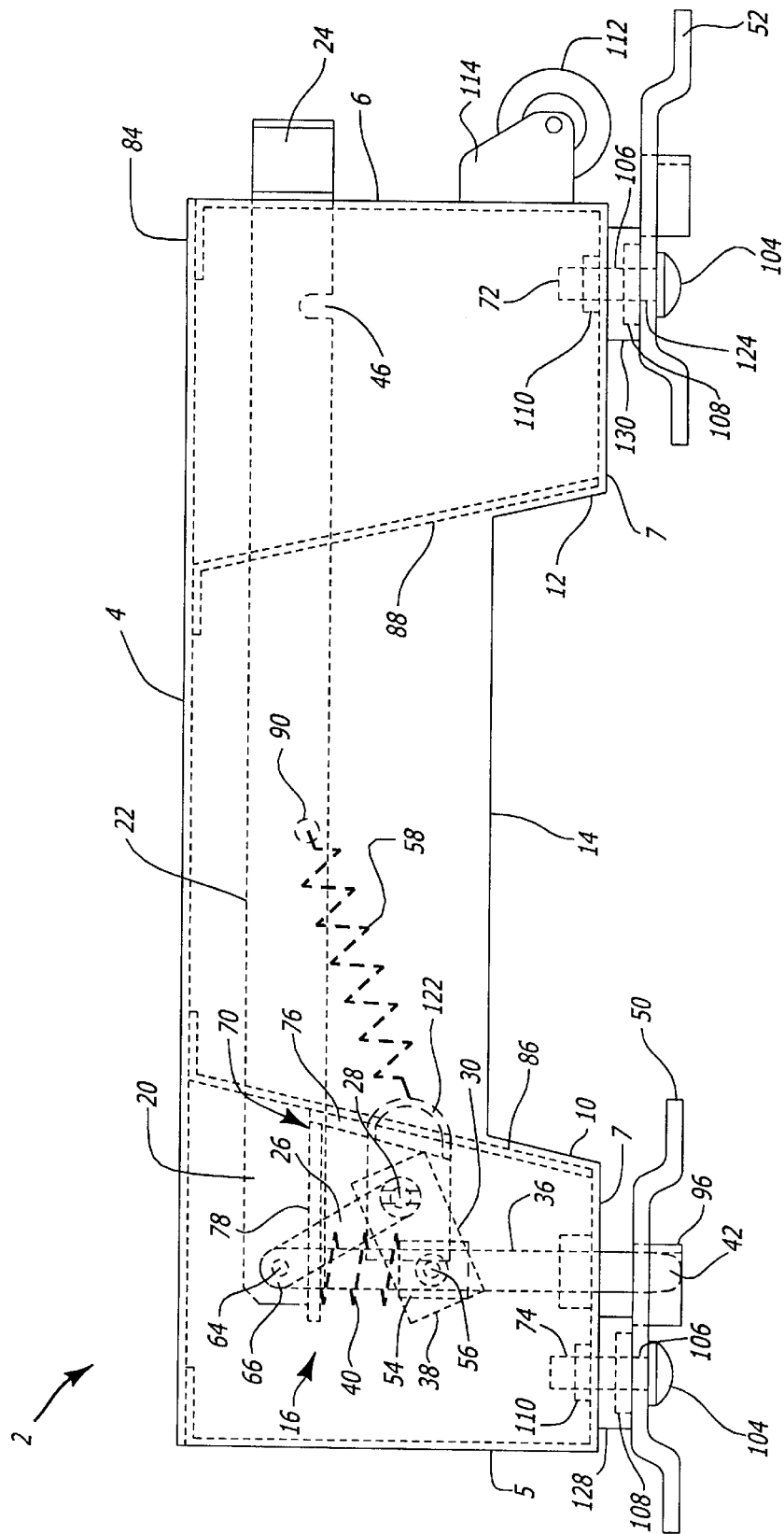
FIG. 2 is a side view of the seat base without a vehicle seat showing the seat base in the locked position.
Figure 3:
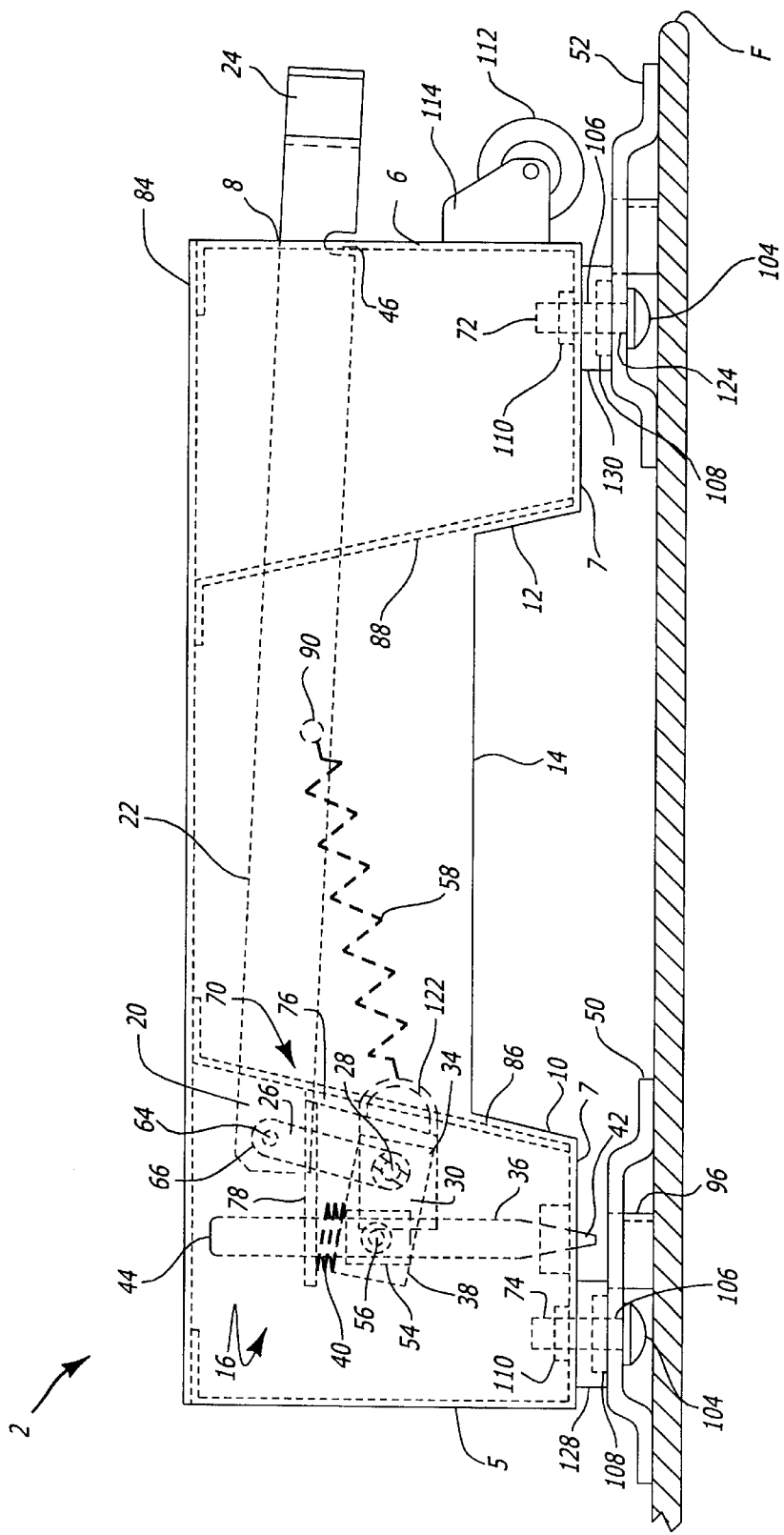
FIG. 3 is a side view of the seat base showing the seat base in the unlocked position.

FIGS. 2 and 3 show seat base 2 without a vehicle seat attached. Inside the housing of seat base 2, is locking mechanism 16, which comprises lever arm 22, linking arms 26, rotating shaft 28, rotating bracket 30, locking pin 36 and spring mechanisms 40 and 58.

Figure 4:
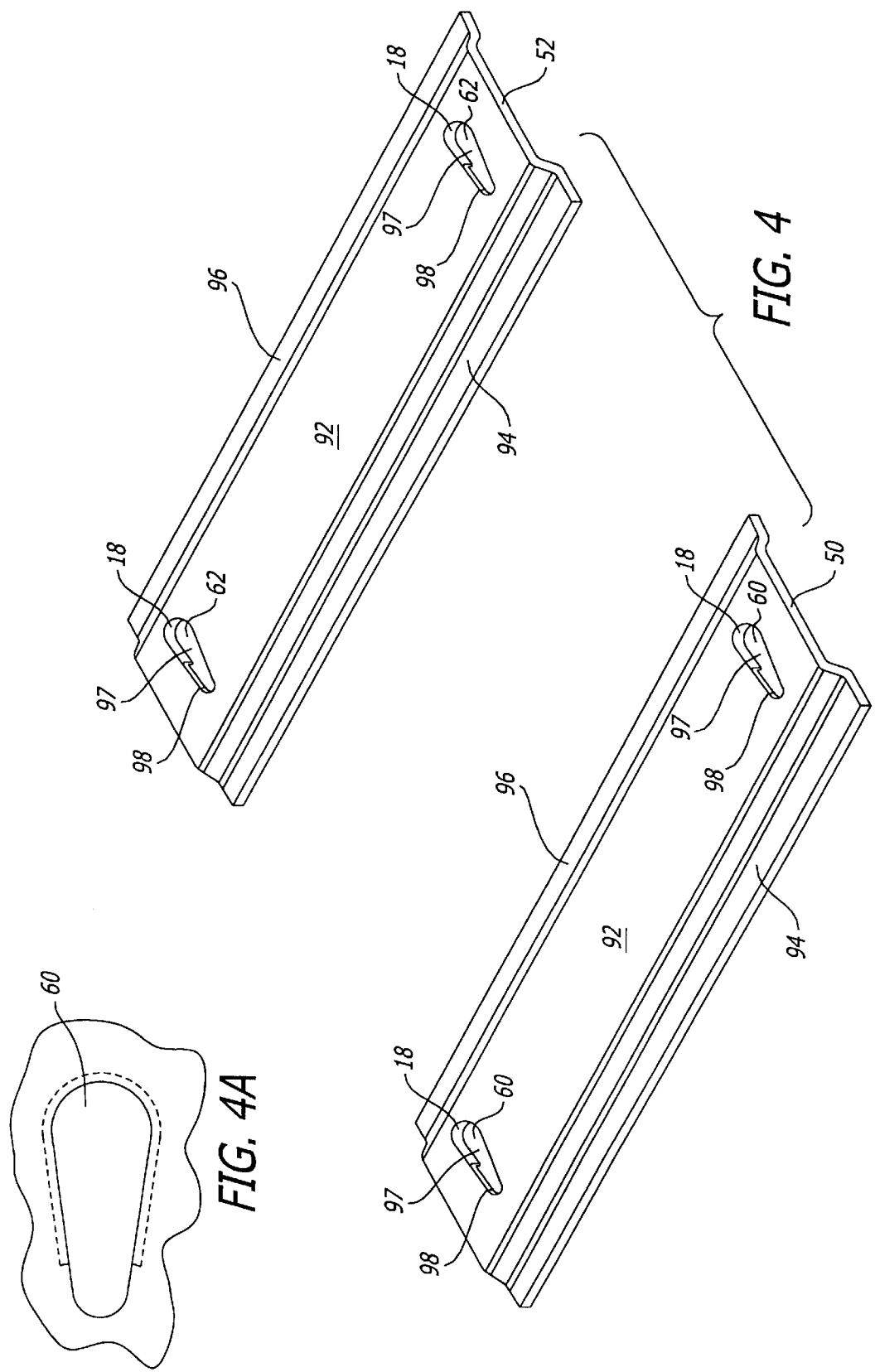
FIG. 4 is a perspective view of one embodiment of the locking plates.
Figure 5:
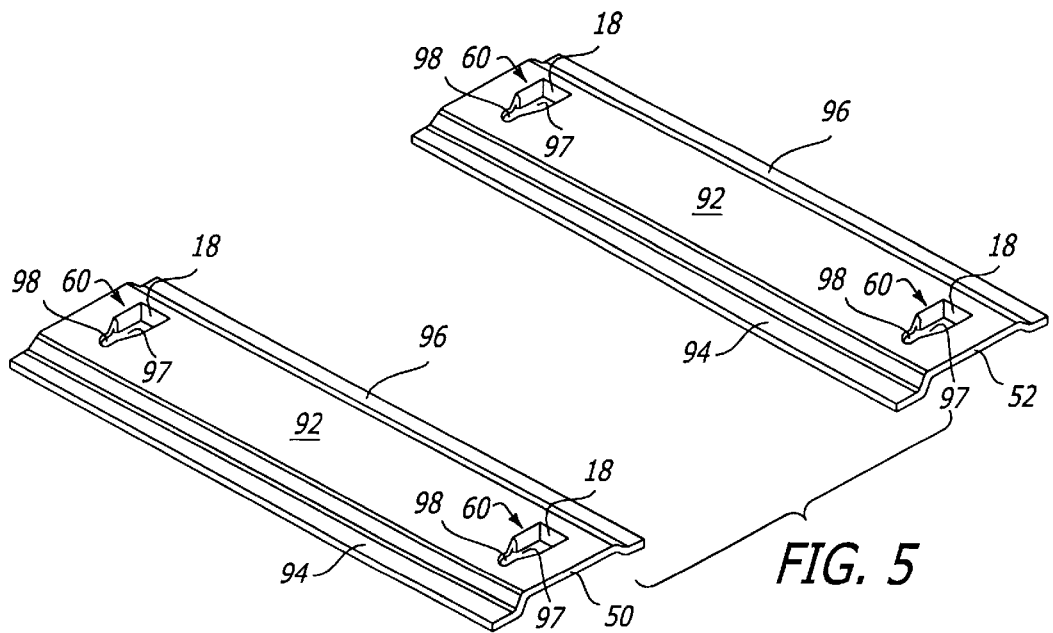
FIG. 5 is perspective view of an alternate embodiment of the locking plates.
Figure 6:
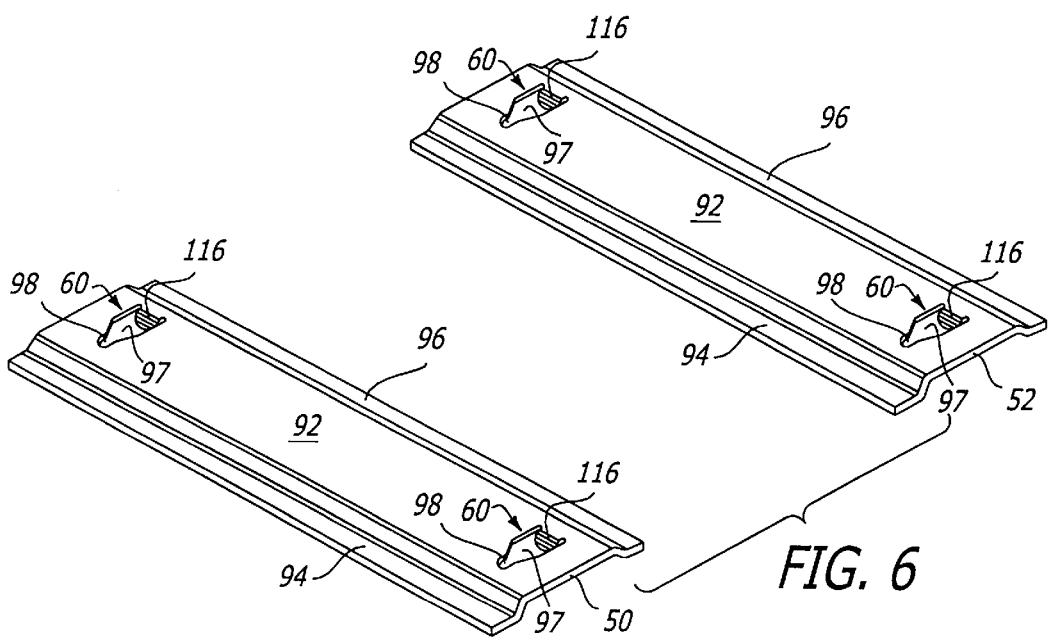
FIG. 6 is a perspective view of another embodiment of the locking plates.

As shown in FIGS. 4—6, locking plates 50 and 52 are secured to the vehicle floor by either bolting the outer edges 94 and 96 to the vehicle floor or welding the plates to the vehicle floor. Locking plates 50 and 52 have a raised middle section 92 with recesses 60 and 62 formed at each end of the locking plates 50 and 52. The recesses 60 and 62 are formed to receive the locking pin 36 and anchor bolts 72 and 74 of the seat base 2 which is described in greater detail below.

Referring to FIGS. 1–3, lever arm 22 is used to lock and unlock the seat base 2 from the locking plates 50 and 52. Lever arm 22, as shown in FIG. 3, extends through the center of the seat base 2 and generally parallel relative to the locking plates 50 and 52. Lever arm 22 is preferably equidistant between side surfaces 9 and 11 (see FIG. 7) and extends outward from the rear surface 6 through opening 8 (not shown) of the seat base 2 as shown in FIG. 1.

As illustrated in FIGS. 1–3, lever arm 22 has a first end 20 and a handle end 24. The lever arm 22 pivots, moving from an inward position (FIG. 2) to an extended position (FIG. 3), which in turn moves the locking pin 36 from a locked position (FIG. 2) to an unlocked position (FIG. 3). The handle end 24 of lever arm 22 is used for grasping the lever arm 22 when moving from the inward to the extended position when locking and unlocking the locking pin 36.

Proximate to the handle end 24 of lever arm 22 is recess 46, which is formed as an aperture in lever arm 22. Recess 46 is configured to receive the rear surface 6 of the seat base 2 adjacent to opening 8. By attaching recess 46 to the rear surface 6 of the seat base 2, the lever arm 22 is locked while in the extended position (FIG. 3).

As shown in FIGS. 7–8, pivotally linked to lever arm 22 at its first end 20 are a pair of linking arms 26, which have an upper end 66 and a lower end (FIG. 3). Each linking arm 26 is coupled at its upper end 66 to lever arm 22 by linking bolt 64. Both linking arms 26 and the first end 20 of lever arm 22 each have an opening formed therein through which linking bolt 64 extends. Linking bolt 64 allows the lever arm 22 and linking arms 26 to pivot with respect to one another when lever arm 22 moves in the horizontal direction from the inward to the extended position. This is illustrated by examining the transition of the relative positions of lever arm 22 and linking arm 26 in FIGS. 2 and 3.

Each linking arm 26 is linked to lever arm 22 between side surfaces 9 and 11 as is shown in FIGS. 7–8. Thus, the junction of the linking arms 26 and lever arm 22 is far displaced from either of the locking pins 36. By manually grasping the handle end 24 of lever arm 22, the lever arm 22 can be moved back and forth in the horizontal direction, that is, between an inward (FIG. 2) to an extended position (FIG. 3). Lever arm 22 can also be moved by an automated means (not disclosed).

By moving lever arm 22 between the inward and the extended positions, each linking arm 26 pivots about bolt 64 which turns rotating shaft 28 (FIGS. 7–8) clockwise when lever arm 22 moves from an inward to an extended position and counterclockwise when lever arm 22 moves from an extended to an inward position. In an alternative embodiment, rotating shaft 28 could be divided into two halves with the division occurring at linking arms 26.

Rotating shaft 28 is fixed at its ends to the first end 34 of rotating bracket 30 (FIG. 2). By the rotation of rotating shaft 28 in the clockwise and counterclockwise direction, the second end 38 of rotating bracket 30 pivots up and down in relation to the top and bottom of the seat base 2. With the vertical pivoting of rotating bracket 30, which is pivotally coupled to locking pin 36, locking pin 36 moves from a locked position (FIG. 2) to an unlocked position (FIG. 3) releasably fastening seat base 2 to locking plate 50.

As shown in FIGS. 7 and 8, there are two locking pins 36 located at the far right and far left side of the first end 10 of seat base 2. In one embodiment (not shown), there can be four locking pins 36 in one seat base 2 with two locking pins located at each end 10 and 12 of seat base 2.

As illustrated in FIGS. 2 and 3, locking pin 36 has a lower end 42 which engages the locking end 97 of recess 60 of locking plate 50. In addition, locking pin 36 has an upper end 44. The locking pin recess is comprised of a locking end 97 formed within the surface of locking plates 50 and 52 to receive the lower end 42 of the locking pin 36 while it is in the locked position. The lower end 42 of the locking pin 36 may either be rounded (FIG. 2) or pointed (FIG. 3) depending on preference. However, it has been found that the rounded lower end provides for a more stable design.

Approximately half-way between the lower end 42 and the upper end 44 of the locking pin 36 is collar 54. Collar 54 is rigidly affixed to the locking pin 36 so as to form a permanent part of the locking pin 36. Thus collar 54 does not move in relation to the locking pin 36 but moves as part of locking pin 36. Pivotally attached to collar 54 is the second end 38 of rotating bracket 30. Rotating bracket 30 is attached to collar 54 by bolt 56 which allows the upper end 38 of rotating bracket 30 to pivot in relation to collar 54. Rotating bracket 30 has an opening formed through its surface for receiving bolt 56 which couples bracket 30 to pivoting pin 36.

Rotating bracket 30 pivots around rotating shaft 28 with its second end 38 moving in the vertical direction when the lever arm 22 is moved between the inward and extended positions. This movement in turn causes locking pin 36 to move in the vertical direction between the locked and the unlocked positions (FIGS. 2–3).

As shown in FIG. 2, attached to first supporting plate 86 and proximate to the locking pins 36, is supporting bracket 70. Supporting bracket 70 has a first end 76 welded or bolted to the housing which attaches the supporting bracket 70 to the first supporting plate 86. Extending horizontally outward from the first end 76 of the supporting bracket 70 is the second end 78 of supporting bracket 70. The second end 78 of supporting bracket 70 has an opening (not shown) formed within the bracket for receiving the upper end 44 of locking pin 36. The opening allows the upper end 44 of the locking pin 36 to move up and down through the opening when moving between the locked and the unlocked positions. While the locking pin 36 is in the unlocked position, its upper end 44 extends substantially above and through the second end 78 of the supporting bracket 70 and towards the underneath side of the top surface 4 as shown in FIG. 3. While the locking pin 36 is in the locked position (FIG. 1), the upper end 44 of the locking pin 36 pivots downward through the opening in the second end 78 of bracket 70.

The locking pin 36 remains in the locked position as shown in FIG. 2 unless lever arm 22 is moved to the extended position (FIG. 3). Two spring mechanisms maintain the locking pins 36 in the locked position unless the lever arm 22 is moved to the extended position. First spring mechanism 40 is positioned around the locking pin 36 between the second end 78 of bracket 70 and collar 54 (FIG. 2). The tension of the first spring mechanism 40 exerts a constant downward force on the collar 54 and locking pin 36 forcing the locking pin 36 into the locked position.

Second spring mechanism 58 maintains the lever arm 22 in the inward position. Located along the length of lever arm 22 is opening 90 to which one end of second spring mechanism 58 attaches. Second spring mechanism 58 extends between the opening 90 to the first supporting plate 86 where the spring mechanism 58 attaches to a ring 122, shaped as a semi-circle, extending outward from the surface of the first supporting plate 86 into middle section 14 of the housing of seat base 2.

Spring mechanism 58 maintains a constant tension on lever arm 22 maintaining lever arm 22 in the inward position. Together, first spring mechanism 40 and second spring mechanism 58 maintains locking pins 36 in the locked position. Thus, when lever arm 22 is pulled from the inward position to the extended position, the tension of first spring mechanism 40 and second spring mechanism 58 resists and forces lever arm 22 and locking pin 36 to the locked position. Thus, as previously described, for maintaining the lever arm 22 in the unlocked position, a handle recess 46 is formed near the handle end 24 of the lever arm 22 for fastening the lever arm 22 to the rear surface 6 of the seat base 2 where opening 8 is formed. As shown in FIG. 3, the handle recess 46 is configured to receive the rear surface 6 of the seat base 2 so that when lever arm 22 is fastened to the rear surface 6, it maintains the lever arm 22 in the unlocked position.

Locking plates 50 and 52 are affixed to the vehicle floor (F) either by bolting or welding the locking plates 50 and 52 to the floor (F) (not shown). As illustrated in FIG. 4, the locking plates have a raised middle section 92 through which recesses 60 and 62 are formed and lowered side sections 94 and 96. When attaching the locking plates 50 and 52 to the vehicle floor F, side sections 94 and 96 are either bolted or welded to the vehicle floor (F) leaving middle section 92 slightly raised above the surface of vehicle floor (F).

As shown in FIGS. 1–3, the first and second ends 10 and 12 of the seat base 2 each have a pair of anchor bolts 74 and 72 affixed to the bottom surface 7, which extend through front and rear bushings 128 and 130 of first and second ends 10 and 12. Extending from the bottom surface of the first end 10 are front anchor bolts 74 and extending from the bottom surface of the second end 12 are rear anchor bolts 72. The anchor bolts 72 and 74 are threaded and screwed through nut 110 which are welded to the bottom 7 of the interior of the seat base 2. The fact that the anchor bolts 72 and 74 are threaded allows the distance between the seat base 2 and the locking plates to be adjusted by turning the anchor bolts 72 and 74. The anchor bolts extend from the bottom 7 of the seat base 2 so that the head 104 of the bolt extends downward with the curved portion of the head 104 facing towards the ground surface. Located above the head 104 of the bolt is the shoulder 106 which forms the main body of the bolt. Above the shoulder 106 of the bolt is a collar 108 which extends outward around shoulder 106. Above the collar 108, the threaded end of the bolt extends upward through the bottom 7 of the first and second ends 10 and 12 of seat base 2 into nut 110. The shoulder 106 of each anchor bolt is held firmly in place by nut 110 which is welded to the interior of the housing. The shoulder 106 portion of the bolt, located between the collar 108 and head 104, is utilized to slide into the locking guide end 98 (FIGS. 4–6) of recesses 60 and 62 thereby fastening the seat base 2 to locking plates 50 and 52.

As shown in FIGS. 4–6, recesses 60 and 62 are configured to receive both anchor bolts 72 and 74 and the locking pin 32. Each recess has a locking end 97 and a locking guide end 98. As shown in FIG. 4, the locking guide end 98 is the narrow end of the recess which is adapted to receive the shoulder 106 of the anchor bolt. The locking end 97 of the recess is the broader end which has a guide wall 18 (in some embodiments) formed around the inside of the recess. The locking end 97 of the recess is configured to receive the lower end 42 of the locking pin 36 thereby securing the seat base 2 to the locking plates 50 and 52.

Seat base 2 attaches to the locking plates by coupling anchor bolts 72 and 74 to the locking plates 50 and 52. Locking plates 50 and 52 are oriented on the floor (F) of the vehicle parallel and aligned to one another so that recesses 60 and 62 of each locking plate 50 and 52 are in line, one behind the other. For attachment, the seat base 2, with the vehicle seat 100 attached, is placed over the locking plates 50 and 52 so that the first and second ends 10 and 12 of the seat base 2 are each placed directly above the locking plates 50 and 52. The first and second ends 10 and 12 should be positioned so that the heads 104 of anchor bolts 72 and 74 fit inside the recesses 60 and 62 of the locking plates 50 and 52. Once all of the anchor bolts 72 and 74 are aligned in relation to the recesses 60 and 62 so that the head 104 of the anchor bolts are located inside the recesses, the seat base 2 is pushed horizontally in the direction from the locking end 97 to the locking guide end 98. If the recesses 60 and 62 are properly aligned with the anchor bolts 72 and 74, the shoulder 106 of the anchor bolts 72 and 74 slidingly engage the edges of the recess until firmly positioned against the locking guide end 98 of the recesses 60 and 62. In addition, as shown in FIGS. 2 and 3, it is preferred that a gap 124 exists adjacent rear anchor bolt 72 between the shoulder 106 of the bolt 72 and the side wall of locking guide end 98. This gap is to allow a certain amount of give between the bolt 72 and the recesses to facilitate removal and reattachment of the seat base 2 to the locking plates 50 and 52.

If the anchor bolts 72 and 74 are properly fastened to the locking plates 50 and 52, the head 104 of the anchor bolt should be located underneath the locking guide end 98 of the recess. Located directly above the locking guide end 98 is collar 108. Thus, if properly fitted, the head 104 of the bolt is directly under and abutting the bottom surface of the locking plate and the shoulder 106 of the front bolt 74 is fitted directly against the locking guide end 98 of the recess and collar 108 of the front bolt 74 is directly above the locking guide end 98 abutting the top surface of the locking plate 50 firmly fastening the seat base 2 to the locking plates 50 and 52. As previously stated, rear anchor bolt 72 has a gap which allows for a certain amount of adjustment. However, while the anchor bolts 72 and 74 stabilize the seat base 2 from movement in the vertical direction, the seat base 2 is not secured against movement in the horizontal direction. The seat base 2 can be easily removed from the locking plates 50 and 52 by sliding the seat base 2 outward from the locking plates 50 and 52. Thus by fastening seat base 2 to the locking plates 50 and 52 by anchor bolts 72 and 74 alone, seat base 2 is not sufficiently secured to the locking plates 50 and 52 in the event of a collision with another vehicle.

To solve the problem of horizontal instability, locking pins 36 are utilized to secure the seat base 2 to locking plates 50 and 52. This is accomplished by moving lever arm 22 from the extended to the inward position which allows the locking pin 36 to move from the unlocked to the locked position. It is important to note that while either attaching or removing the seat base 2 from the locking plates 50 and 52, it is critical that the locking pins 36 are in the unlocked position which, as previously described, requires the lever arm 22 to be in the extended position and handle recess 46 to be attached to the side wall 6. In addition, in order to properly move the locking pin 36 into the locked position, it is important that the shoulders 106 of the anchor bolts 72 and 74 are properly aligned in recesses 60 and 62.

Once the anchor bolts 72 and 74 are completely engaged with the locking guide end 98 of the recesses, locking pin 36 can be moved into the locked position as is shown in FIG. 2. The lower end 42 of the locking pin 36 is adjacent to the bottom of the recess while the side of the locking pin 36 abuts the guide wall 18 of the locking end 97 of the recess. By moving the locking pins 36 to the locked position, seat base 2 is stabilized in both the horizontal and vertical direction securing the seat base 2 in case of collision. It is important to note that the locking pin 36 could also be a cam latch or other locking mechanism.

In removing the seat base 2 from the locking plates 50 and 52, the steps of attaching the seat base 2 to the locking plates 50 and 52 are simply performed in reverse. The lever arm 22 is pulled outward, either manually or by automated means, from the inward position to the extended position and locked in the extended position. This moves locking pin 36 from the locked to the unlocked position thereby releasing the locking pin 36 from the locking plate 50. The seat base 2 is then pushed or pulled back in a horizontal direction to disengage the anchor bolts 72 and 74 from the locking guide ends 98 of the recesses. Once the heads 104 of the anchor bolts are disengaged from the locking guide ends 98 and are adjacent the locking end 97, the seat base 2 can be removed from the locking plates 50 and 52 by sliding the seat base 2 outward from the locking plates 50 and 52 in the direction from the locking guide end 98 to the locking end 97.

Affixed to the rear surface 6 of the seat base 2 are wheels 112 which are attached to the seat base 2 by brackets 114. Once the seat base 2 is disengaged from the locking plates, the vehicle seat 100 and seat base 2 can be tilted back so as to roll the seat base 2 on its wheels 112 for easy transport away from the locking plates 50 and 52 and out of the vehicle. This prevents having to lift the vehicle seat 100 out of the vehicle.

Figure 10:
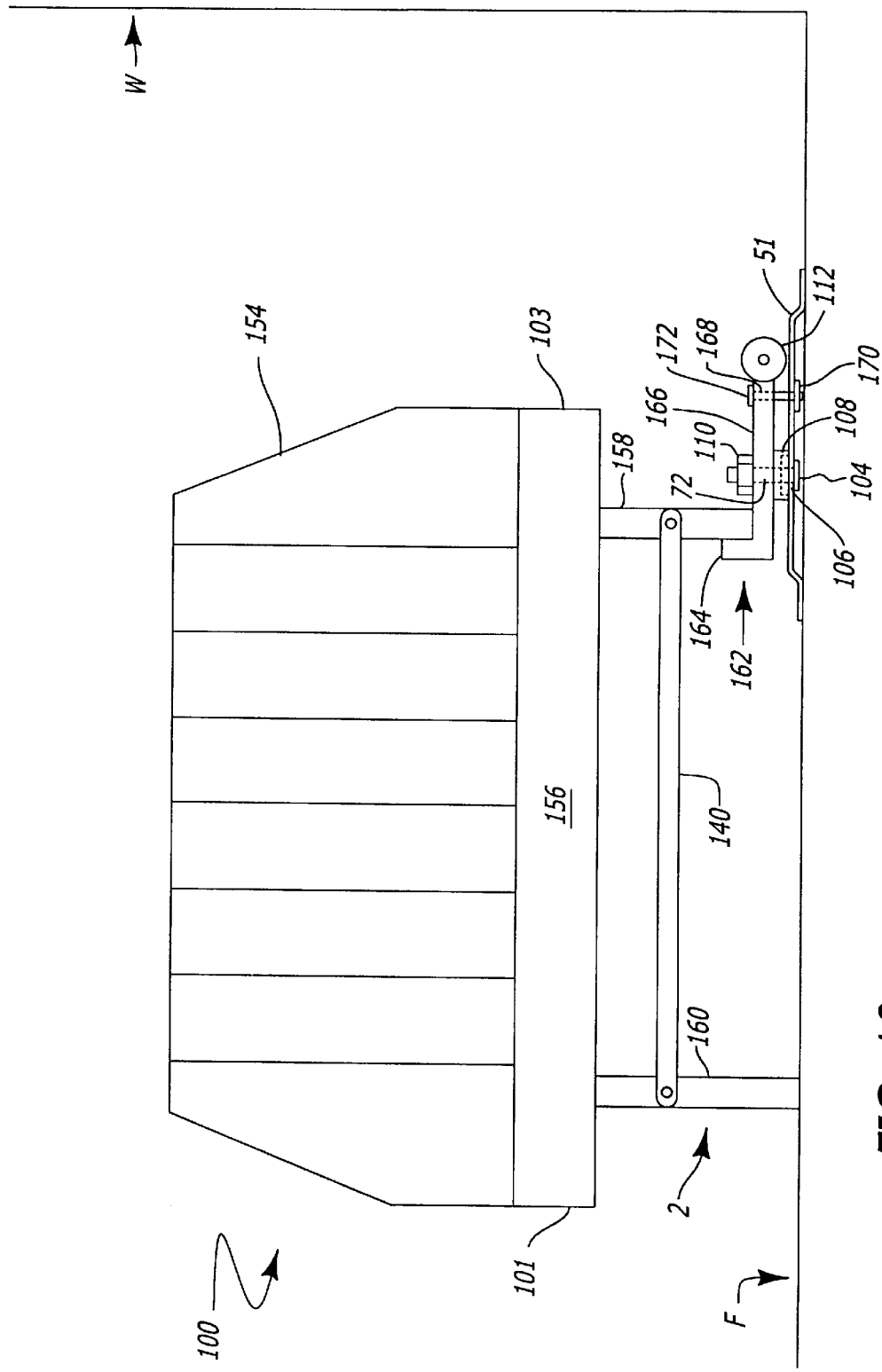
FIG. 10 is a frontal view of a foldable seat bench in the seating position.
Figure 12:
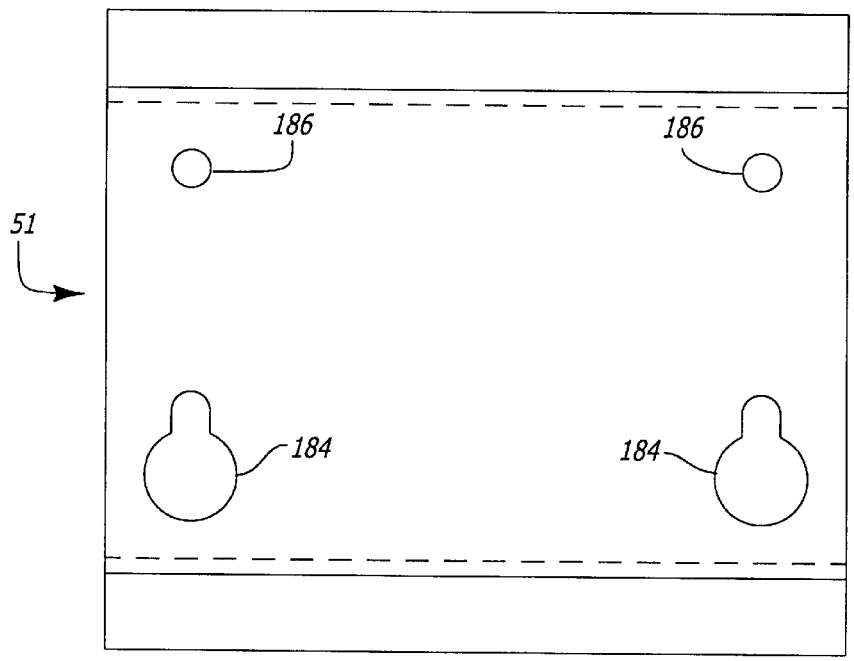
FIG. 12 is a top view of an alternate embodiment of a locking plate for receiving a foldable vehicle bench seat.

In FIGS. 10–12, an alternate embodiment of the removable seat mechanism is illustrated. This embodiment shows a removable vehicle seat which pivots from a seating position to a stowed position where the vehicle seat is vertically stored against the vehicle wall (w) which allows for creating open space within the vehicle.

FIG. 10 shows a bench vehicle seat 100 attached to seat base 2 in the seating position. FIG. 11, which shows the vehicle seat in the upright stowed position, shows seat base 2 from underneath the seat base 2 which is comprised of two elongated support beams 136 and 138 which are parallel to one another. Support beams 136 and 138 are horizontally disposed while the seat base 2 is in the seating position and vertically disposed while the seat base 2 is in the stowed position.

Support beams 136 and 138 extend beneath and along the length of the vehicle seat 100 thereby providing structural support for the vehicle seat 100 and the occupants of the seat. Extending between and perpendicular to support beams 136 and 138 are cross bars 146 and 148 (FIG. 11). Cross bars 146 and 148 connect support beams 136 and 138 together and add structural support to the seat base 2. As shown in FIG. 11, cross bar 146, which is stationary, is attached to support beams 136 and 138 by brackets 150 and 152, which allows the support beams 136 and 138 and the vehicle seat 100 to rotate around cross bar 146. Cross bar 148, which is also stationary, is simply welded or affixed by similar means to support beams 136 and 138. This will be discussed later in further detail.

Seat base 2 includes two support members 158 and 160 (FIG. 10) extending from beneath the lower surface of the vehicle seat to the vehicle floor (F). Support member 158, which is beneath the fixed end of seat base 2, has welded at its upper end cross bar 146 (FIG. 11). Cross bar 146 is horizontally disposed and fixed along the length of the upper edge of support member 158.

As shown in FIG. 10, support member 158 has a mounting bracket 162 affixed at its lower end. Mounting bracket 162 is comprised of an elongated horizontal leg 166 and a shorter vertical leg 164 which are perpendicular to one another and are connected as one piece generally forming a right angle junction. At the junction of the shorter vertical leg 164 and elongated horizontal leg the mounting plate 166, the lower end of support member 158 is permanently affixed by either bolting or welding support member 158 to mounting bracket 162. Thus, support member 158 and mounting bracket 162 form one coextensive piece.

Affixed to mounting bracket 162 are a pair of anchor bolts 72 (rear anchor bolt not shown) which extend through openings in the mounting plate 166 of the mounting bracket 162. The pair of anchor bolts 72 are oriented generally vertical to mounting plate 166.

Anchor bolts 72 are threaded, as are the openings in the mounting bracket 162 which receives the anchor bolts 72. After the anchor bolts 72 are inserted into the mounting plates, they are further secured in place by nut 110. The main body of the anchor bolts 72 extend below mounting bracket 162 in the same manner as previously described with the shoulder 106 of the anchor bolts 72 extending between collar 108 and head 104 (FIG. 10).

Affixed to the vehicle floor beneath mounting bracket 162 is locking plate 51. As shown in FIG. 12, locking plate 51 differs from the previously described locking plates and has a pair of recesses 184 formed in its upper surface which are configured to receive anchor bolts 72. The recesses 184, or locking guide ends, receive the shoulder 106 of the anchor bolts which slidingly engage the pair of recesses 184 for releasably locking the seat base 2 to the locking plate 51. While anchor bolts 72 releasably fasten seat base 2 to locking plate 51, a pair of bolts 168 (rear bolt not shown) permanently affixes seat base 2 to locking plate 51. As shown in FIG. 10, bolts 168, which are also threaded, are inserted through threaded openings in mounting bracket 162 and through threaded openings in locking plate 51 coupling the mounting plate and the locking plate together (FIG. 10). The bolts 168 are further secured through the bottom of locking plate 51 by nut 170. The head of the bolt 172 is positioned adjacent the top of the mounting bracket 162. Thus, as in the other embodiments of the removable vehicle seat, the seat base 2 releasably attaches to locking plate 51. However, in this embodiment, bolts 168 must each be separately removed before the seat base 2 will disengage from the locking plate 51.

As shown in FIG. 10, support member 160 is not attached to the vehicle surface by either a mounting plate or a locking plate. The lower edge of support member 160 simply rests against the vehicle floor (F). Support member 160 is free to pivot as the seat base 2 is moved and pivots along axis line 15—15 (FIG. 11). However, limiting the freedom of movement of support member 160 is connecting bar 140 which pivotally connects support members 158 and 160.

The seat base 2 and vehicle seat 100 moves between a seating position as shown in FIG. 10 and a stowed position as shown in FIG. 11. The seat base 2 is maintained in the seating position as shown in FIG. 10 where the vehicle seat 100 is generally parallel to the vehicle floor (V). The vehicle seat 100 is maintained in the seating position when the vehicle seat 100 is used by occupants. The vehicle seat 100 may then be moved to the stowed position when it is necessary to create more space in the vehicle.

For moving the vehicle seat 100 to the storage position, the back support 154 of vehicle seat 100 is folded down against the seat cushion 156. For moving the vehicle seat 100 against the vehicle wall (W), the free end 101 of vehicle seat 100, which is proximate to support member 160, is lifted upwards in arcuate motion towards the vehicle wall (W) and the vehicle seat 100 is moved from a horizontal seating position (FIG. 10) to a vertical storage or stowed position (FIG. 11).

Seat base 2 pivots about cross bar 146 along line 4–4 as shown in FIG. 11. Cross bar 146 is rigidly affixed to support member 158. Cross bar 146 is connected to support beams 136 and 138 by brackets 150 and 152 as shown in FIG. 11A.

Brackets 150 and 152 are welded to the top of support beams 136 and 138. Brackets 150 and 152 are formed of a circular collar 174 for receiving the ends of cross bar 146. Extensions 176 and 178 extend outward from the collar 174 and stabilize the brackets 150 and 152 against the support beams. Brackets 150 and 152 are permanently affixed to support beams 136 and 138 by either welding or bolting the extensions 176 and 178 of brackets 150 and 152 onto the support beams 136 and 138.

When the seat base 2 pivots from a seating position (FIG. 10) to a stored or stowed position (FIG. 11), the seat base 2, including support members 136 and 138 and brackets 150 and 152, rotates around cross bar 146. Conventional friction-reducing lubricant may be used to facilitate the rotation of the collar 174 about cross bar 146.

While support member 158 is affixed in one position, support member 160 is allowed to freely rotate about cross bar 148. As shown in FIG. 11, support member 160 is affixed to rotatable sleeve 182. The top edge of support member 160 is welded or permanently affixed by a similar means to the outer surface of rotatable sleeve 182. Rotatable sleeve 182 freely rotates about cross bar 148. However, cross bar 148 is permanently affixed to the support beams 136 and 138 by welding or other means. Conventional friction reducing lubricant may be used to facilitate the rotation of sleeve 182 about cross bar 148.

When the seat base 2 is in the seating position, as shown in FIG. 10, support member 160 is perpendicular to the horizontally disposed seat base 2 and acts as a support. When the seat base 2 is in the stowed position as shown in FIG. 11, support member 160 is vertically aligned against the underside of vehicle seat 100. Connecting bar 140 restricts the freedom of rotation of support member 160 forcing it to move in accordance with the movement of the seat base 2 from the seating position to the stowed position. Thus, as the seat base 2 moves between the two positions, support member 160 moves accordingly.

Thus, in this embodiment of the removable seat mechanism, the vehicle seat 100 pivots to a stowed position against the vehicle wall (W) to create more space as is required for the use of the vehicle by disabled persons. There is also a locking mechanism which helps stabilize the vehicle seat 100 while it is in the stowed position. In addition, as shown in FIG. 10, wheels 112 are attached to the end of the mounting plate 166 of mounting bracket 162. The wheels 112 facilitate removal of the vehicle seat 100 from the vehicle once the seat base 2 is removed from the locking plate 51. Removal is accomplished by simply removing bolts 168 from the mounting bracket 162 and the locking plate 51 and disengaging the anchor bolts 72 from the locking plate 51 and lifting the free end of the seat base 2 and rolling the vehicle seat 100 out of the vehicle.

In all of the embodiments of the present invention, locking plates 50, 51 and 52 come in various designs. For example, as shown in FIG. 5, recess 60 has a square locking end 97 with square guide walls 18 for receiving the locking pin 36. FIG. 6 also illustrates an alternative design for the recesses which include locking tabs 116 which act to further lock the locking pin 36 in the recesses.

FIG. 7 is a top view of the seat base 2 attached to the locking plates 50 and 52 in the locked position. FIG. 8 shows an alternative arrangement of the locking plates 50 and 52 in relation to seat base 2 with the locking plates 50 and 52 parallel to the lever arm 22. FIG. 8 also shows the seat base 2 in the locked position.

Figure 9:
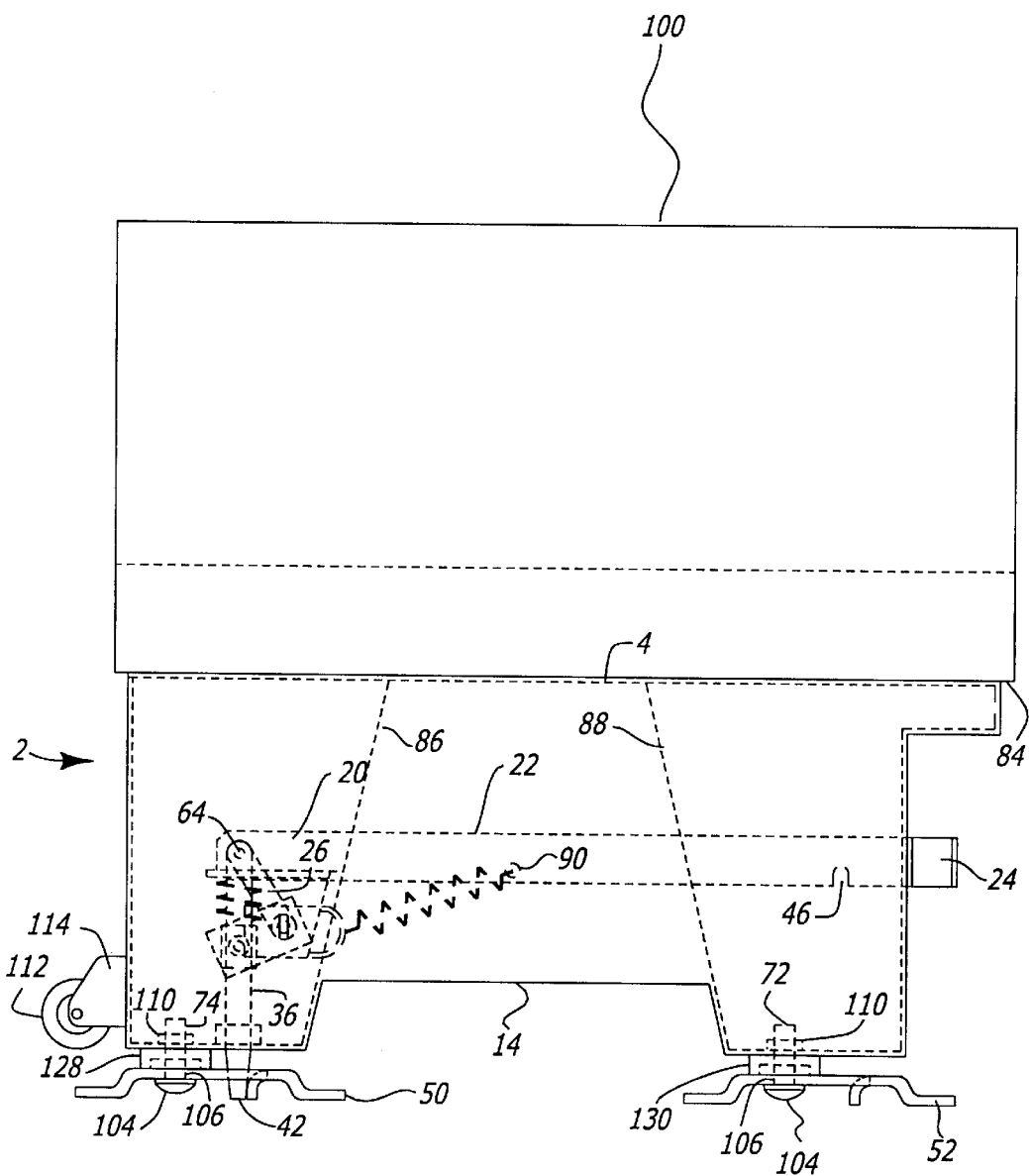
FIG. 9 is a frontal view of the seat base in the locked position with a bench seat attached to the seat base.

FIG. 9 shows a larger seat base 2 designed for a bench vehicle seat 100 with the wheels 112 located on the opposite side of the seat base 2 from the previous disclosures. FIG. 9 also shows an alternate embodiment of the seat base 2 wherein the second end 12 of the seat base 2 is cut away so as to prevent the handle end 24 of the lever arm 22 from extending beyond the edge of the housing to prevent injury.

FIGS. 13–17 show various embodiments of the locking plates. A center line is utilized in FIGS. 13–17 which is simply intended to signify that only half of the locking plate with the other half of the locking plate being a mirror image from what is illustrated.

Figure 13:
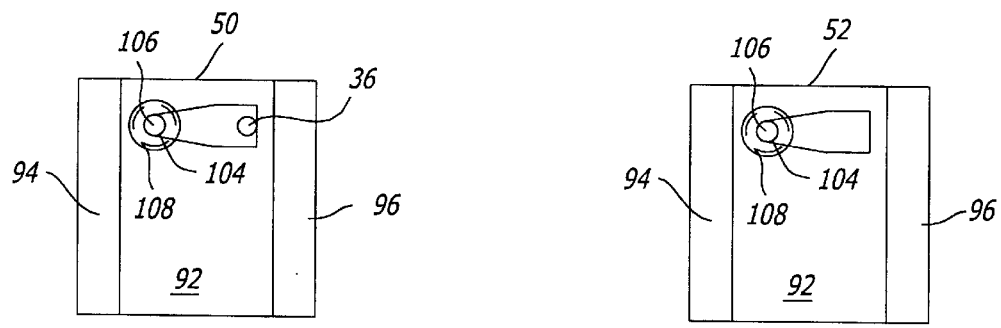
FIG. 13 is a top view of an alternate embodiment of the locking plates.

FIG. 13 shows locking plates 50 and 52 of reduced size, where each locking plate has one recess. As shown in FIG. 13, locking plate 50 shows anchor bolts 72 and 74 and locking pin 36 in the locked position with the head 104, shoulder 106 and collar 108 shown from above. A longitudinal line is also inserted to emphasize the proper alignment required for the locking pin 36 and anchor bolt 72. Each locking plate is separately attached to the vehicle floor. The reduced size of the locking plates lowers the overall weight of the removable vehicle seat which is sometimes necessary for compliance with government regulations and certain other applications.

FIG. 14 shows multiple locking plates (50, 50', 52, 52') affixed to the vehicle floor. The purposes of multiple looking plates as illustrated in FIG. 14 is to allow the vehicle seat (not shown) to be attached to the vehicle floor in two positions, that is, a rear and a forward position.

FIG. 15 shows multiple locking plates (50, 50', 52, 52') affixed to the vehicle floor (F) with multiple recesses (60, 60', 118, 118', 62, 62', 120, 120') formed within the locking plates. As in FIG. 14, the multiple locking plates allow the vehicle seat to be positioned in a rear and forward position. The multiple recesses (60, 60', 118, 118', 62, 62', 120, 120') formed within the locking plates (50, 50', 52, 52') are used to accommodate seat bases of various dimensions without changing the locking plates. The locking plates 50, 50' and 52, 52' have recesses 60, 60' and 62, 62' formed on the outer edge of the locking plates with additional recesses 118, 118' and 120, 120' also formed in the locking plates 50 and 52.

Figure 16:
FIG. 16 is a top view of the smaller locking plates showing multiple recesses formed therein; and, FIG. 17 is a top view showing the recesses reversed in the opposite direction from the previously disclosed locking plates.

FIG. 16 shows vehicle plates (50, 50', 52, 52') of reduced size with multiple recesses 60, 60', and 62, 62' and 118, 118' and 120, 120' formed within the vehicle plates.

Figure 17:
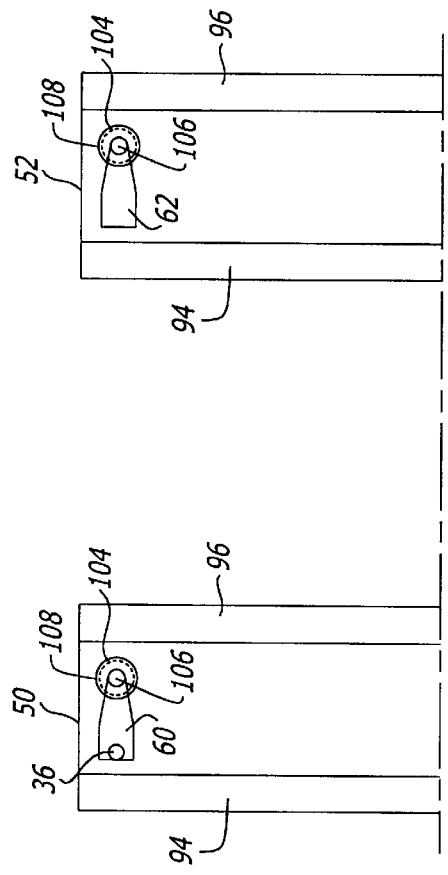

FIG. 17 shows vehicle plates 50 and 52 with the recesses 60 and 62 reversed for accommodating a vehicle seat facing in the reversed direction.

It may be seen that the system of the present invention may be readily incorporated in various embodiments to provide a removable vehicle seat. The various components and dimensions disclosed herein are merely exemplary, and of course, various alternative techniques may be employed departing from those disclosed and suggested herein. Consequently, it is to be understood that he scope hereof should be determined in accordance with the claims as set forth below.

What is claimed is:

1. A removable vehicle seat for attaching to a vehicle floor and including at least one locking plate comprising:
   a seat base for supporting a vehicle seat;
   at least one locking plate secured to the vehicle floor wherein said seat base releasably fastens to said locking plate;
   said locking plate having recesses formed therein;
   at least one locking pin affixed to said seat base which moves between a locked and unlocked position for releasably locking said seat base to said at least one locking plate;
   at least two anchor bolts affixed to said seat base to releasably fasten said seat base to said locking plate; and,
   said recesses of said locking plate having a locking end and a locking guide end wherein said locking guide end is configured to receive said anchor bolts and said locking end is configured to receive said locking pin.

2. A removable vehicle seat of claim 1 further comprising a locking mechanism comprising a lever arm for moving said locking pin between the locked position and the unlocked position.

3. The removable vehicle seat of claim 2 wherein said lever arm extends outward from said seat base and moves from an inward to an extended position and at least one linking arm couples said lever arm to said locking pin wherein said locking pin moves from a locked position to an unlocked position by moving said lever arm from an inward to an extended position.

4. The removable vehicle seat of claim 3 wherein said lever arm has an aperture formed therein for receiving a side wall of said seat base for locking said lever arm while in the extended position.

5. The removable vehicle seat of claim 2 wherein said lever arm locks in said extended position maintaining said locking pin in said unlocked position.

6. The removable vehicle seat of claim 2 wherein a spring mechanism maintains said locking pin in the locked position.

7. The removable vehicle seat of claim 1 wherein said anchor bolts slidingly engage said recesses of said locking plate to releasably fasten said seat base to said locking plate.

8. The removable vehicle seat of claim 1 wherein said locking pin has a lower end and said locking pin moves from an unlocked position to a locked position wherein said lower end of said locking pin engages said locking end of said recess when said seat assembly is fastened to said locking plate and said locking pin is in the locked position.

9. A removable vehicle seat for attaching to a vehicle floor with at least one locking plate comprising:
   a seat base for supporting a vehicle seat wherein said seat base has an upper surface and a lower surface;
   at least one locking plate secured to the vehicle floor wherein said seat base releasably fastens to said locking plate;
   a locking mechanism located within said seat base comprising a locking means for releasably locking said seat base to said locking plate;
   a lever arm which moves between an inward and an extended position thereby moving said locking means between the locked and unlocked positions;
   said at least one locking plate having at least two recesses formed therein wherein said recesses are configured to receive said anchor bolts; and,
   said seat base releasably fastening to said at least one locking plate by sliding said anchor bolts into said recesses of said locking plates and moving said lever arm from the extended position to the inward position thereby moving said locking pin from the unlocked to the locked position.

10. The removable vehicle seat of claim 9 wherein said seat base has anchor bolts affixed to its lower surface.

11. The removable vehicle seat of claim 9 wherein said locking means pivots between a locked and unlocked position thereby releasably locking said seat base to said locking plate.

12. The removable vehicle seat of claim 9 wherein said locking means is a locking pin.

13. The removable vehicle seat of claim 9 wherein said seat base releasably fastens to two locking plates affixed to the vehicle floor.

14. The removable vehicle seat of claim 13 wherein said seat base is removable from said locking plates by moving said locking pin to the unlocked position by pulling said lever arm to the extended position and sliding said vehicle seat outward from the locking plates thereby releasing said anchor bolts from said recesses.

15. The removable vehicle seat of claim 9 wherein a bracket extending within said seat base maintains said locking pin in vertical alignment with said recess of said locking plate.

16. The removable vehicle seat of claim 15 wherein a spring mechanism coupling said bracket to said locking pin maintains said locking pin in the locked position.

17. A removable vehicle seat for attaching to a vehicle floor including at least one locking plate comprising:
   a seat base for supporting a vehicle seat wherein said seat base has an upper surface and a lower surface and first and second ends;
   at least one locking plate affixed to the vehicle floor wherein said locking plate has recesses formed therein;
   said seat base having wheels attached thereto;
   said seat base having a locking mechanism for releasably locking said seat base to said locking plate; and,
   said seat base has anchor bolts affixed to the front and rear portion of the lower surface of the seat base for slidably fastening said seat base into said recesses of said locking plate.

18. The removable vehicle seat of claim 17 wherein said locking mechanism comprises at least one locking pin wherein said locking pin engages one of said recesses in said locking plates thereby securing said seat base to said locking plates.

19. The removable vehicle seat of claim 17 wherein said locking plates have at least one recess, said recess having a locking end and a locking guide end wherein said locking end is configured to receive said locking pin and said locking guide end is configured to receive said anchor bolts.

20. The removable vehicle seat of claim 17 wherein said locking mechanism has a lever arm coupled thereto which can be manually operated to move said locking pin between the locked and the unlocked position.

21. The removable vehicle seat of claim 17 wherein said lower surface of said seat base has a front and rear portion with a raised middle section.

22. A removable vehicle seat for attaching to a vehicle floor with at least one locking plate comprising:
   a seat base for supporting a vehicle seat;
   at least one locking plate affixed to a vehicle floor surface wherein said locking plate has recesses formed therein;
   said seat base having a pivotal mechanism for pivoting said vehicle seat about an axis from a first seating position wherein said vehicle seat is substantially parallel to the vehicle floor surface and a second position wherein said vehicle seat is substantially perpendicular to the vehicle floor surface;
   said seat base having a first and second support members for supporting said seat base wherein said first support leg is releasably attached to said locking plate; and
   said first support member is affixed to a mounting bracket which has at least one anchor bolt affixed thereto for releasably locking said mounting bracket to said locking plate.

23. The removable vehicle seat of claim 22 wherein said anchor bolt slidingly engages in said recesses formed within said locking plate.

24. The removable vehicle seat of claim 22 wherein said locking plate has two recesses for receiving said at least one anchor bolt.

25. The releasable vehicle seat of claim 22 wherein said mounting bracket has at least one wheel attached thereto.

26. The removable vehicle seat of claim 22 wherein said first and second support members are pivotally connected by a connecting bar.

27. A removable vehicle seat for attaching to a vehicle floor with at least one locking plate:
   a seat base for supporting a vehicle seat wherein said seat base has an upper surface and a lower surface and first and second ends;
   at least one locking plate affixed to the vehicle floor wherein said at least one locking plate has recesses formed therein;
   said seat base having wheels attached thereto;
   said seat base having a locking mechanism for releasably locking said seat base to said at least one locking plate; and,
   said locking mechanism comprising at least one locking pin wherein said locking pin engages one of said recesses in said locking plates thereby securing said seat base to said at least one locking plate.

28. The removable vehicle seat of claim 27 wherein said seat base has anchor bolts affixed to the front and rear portions of the lower surface of said seat base for slidably fastening said seat base into said recesses of said at least one locking plate.

29. The removable vehicle seat of claim 27 wherein said at least one locking plate has at least one recess, said recess having a locking end and a locking guide end wherein said locking end is configured to receive said locking pin and said locking guide end is configured to receive said anchor bolts.

30. The removable vehicle seat of claim 27 wherein said at least one locking plate comprises two locking plates.

31. A removable vehicle seat for attaching to a vehicle floor with at least one locking plate:
   a seat base for supporting a vehicle seat wherein said seat base has an upper surface and a lower surface and first and second ends;
   at least one locking plate affixed to the vehicle floor wherein said locking plate has recesses formed therein;
   said seat base having wheels attached thereto;
   said seat base having a locking mechanism for releasably locking said seat base to said at least one locking plate; and,
   said at least one locking plate having at least one recess, said recess having a locking end and a locking guide end wherein said locking end is configured to receive said locking pin and said locking guide end is configured to receive said anchor bolts.

32. The vehicle seat of claim 31 wherein said locking mechanism comprises at least one locking pin wherein said locking pin engages one of said recesses in said at least one locking plate thereby securing said seat base to said at least one locking plate.

33. The vehicle seat of claim 31 wherein said at least one locking plate comprises two locking plates.

* * * * *